United States Patent [19]

Ando

[11] Patent Number: 5,241,174
[45] Date of Patent: Aug. 31, 1993

[54] SCANNING OPTICAL APPARATUS HAVING IMAGING POSITION ADJUSTING MEANS

[75] Inventor: Toshinori Ando, Yokohama, Japan

[73] Assignee: Canon Kabushiki Kaisha, Tokyo, Japan

[21] Appl. No.: 838,323

[22] Filed: Feb. 20, 1992

Related U.S. Application Data

[60] Division of Ser. No. 754,306, Sep. 4, 1991, Pat. No. 5,122,658, which is a continuation of Ser. No. 670,529, Mar. 18, 1991, abandoned, which is a continuation of Ser. No. 593,349, Oct. 3, 1990, abandoned, which is a continuation of Ser. No. 292,443, Dec. 30, 1988, abandoned.

[30] Foreign Application Priority Data

Jan. 6, 1988 [JP] Japan .................................. 63-856
Aug. 12, 1988 [JP] Japan .................................. 63-201312

[51] Int. Cl.$^5$ ................................................ H01J 3/14
[52] U.S. Cl. ...................................... 250/235; 358/494
[58] Field of Search ............................ 250/234–236; 358/481, 492, 494, 496; 359/205, 216–218, 664

[56] References Cited

U.S. PATENT DOCUMENTS

5,122,658 6/1992 Ando .................................. 250/235

Primary Examiner—David C. Nelms
Assistant Examiner—Stephone B. Allen
Attorney, Agent, or Firm—Fitzpatrick, Cella, Harper & Scinto

[57] ABSTRACT

A scanning optical apparatus includes a light source, a modulator for intermittently modulating a beam from the light source or for modulating it in amplitude, imaging device for imaging the beam from the light source at predetermined position, a deflector for deflecting the beam from the light source in a predetermined direction, a photoreceptor for receiving the beam deflected by the deflector and modulated by the modulator, processing device for processing a signal produced by the photoreceptor, and an adjusting device, responsive to the processing device, for adjusting an imaging position of the beam by the imaging device.

8 Claims, 11 Drawing Sheets

SCANNING OPTICAL APPARATUS HAVING IMAGING POSITION ADJUSTING MEANS

This application is a division of application Ser. No. 07/754,306 filed Sep. 4, 1991, now U.S. Pat. No. 5,122,658 which was a continuation of Ser. No. 07/670,529, filed Mar. 18, 1991, abandoned, which was a continuation of Ser. No. 07/593,349, filed Oct. 3, 1990, abandoned, which was a continuation of Ser. No. 07/292,443 filed Dec. 30, 1988, abandoned.

FIELD OF THE INVENTION AND RELATED ART

The present invention relates to a scanning optical apparatus for scanning a surface to be scanned with a beam from a light source through a deflector and a lens system, more particularly to a scanning optical apparatus provided with a mechanism for detecting a deviation of a focus point of an imaged spot by the beam on the surface to be scanned which is attributable to variation in ambient conditions such as temperature or the like, and for correcting the deviation.

Recently a laser beam printer is widely used which comprises as a scanning optical apparatus to modulate a laser beam from the laser source in accordance with an image signal; to periodically deflect the laser beam produced and modulated by the laser source by a deflector; to converge the laser beam by a lens system to form a spot on a photosensitive recording medium which is the surface to be scanned; and to expose and scan the recording medium with the laser beam.

The conventional laser beam printer involves a problem that due to the variation in the ambient temperature, members constituting the lens system are deformed with the result of the laser converging point on the photosensitive member (the surface to be scanned) is deviated, so that the image quality is degraded.

In an attempt to avoid the problem, Japanese Laid-Open Patent Application No. 100113/1985 proposes use of a detecting means for detecting deviation of the focus point of the beam scanning the photosensitive member and a correcting lens for correcting the focus deviation by movement thereof.

However, the proposal uses astigmatism for detection of the focus deviation. This is effective for a stationary beam, but is not suitable for detection of the focus deviation of a light beam moving at a high speed.

Japanese Laid-Open Patent Application 81873/1987 makes another proposal wherein the focus deviation detecting means includes a plurality of light receiving elements arranged in a direction perpendicular to the scanning direction by the light beam, wherein the number of the light receiving elements which receive the beam is used as information or data for the focus adjustment.

This is capable of detecting a size of the imaged spot in the sub-scan direction which is perpendicular to the scanning direction, but the size thereof in the main scan direction can not be detected. In usual laser beam printer, the size of the imaged spot is smaller in the main scan direction than in the sub-scan direction, and therefore the size of the imaged spot measured in the main scan direction is more easily influenced by the ambient condition variation than the size thereof in the sub-scan direction. For this reason, this system does not provide a scanning optical apparatus wherein the focus deviation of the imaged spot attributable to the variation in the ambient temperature is prevented to assure correct laser scanning action.

Japanese Patent Application Publication 9243/1985 discloses a means for adjusting focus of the scanning spot including a photodetector, disposed on a scanning line other than the scanning width for the scan of the surface to be scanned, for detecting a size of the spot beam. This system is capable of detecting the size of the spot when the scanning speed is low, but when the moving speed of the spot is high (1 micron/1 n sec), it is difficult to detect the size of the spot. In addition, the detection signal is differentiated by a differentiation circuit, and therefore, the structure of the circuit is complicated.

Accordingly, it is a principal object of the present invention to provide a scanning optical apparatus wherein the focus deviation of the scanning means can be stably detected.

According to an embodiment of the present invention, there is provided a scanning optical apparatus, comprising: a light source; modulating means for intermittently modulating a beam from said light source or for modulating it in amplitude; image means for imaging the beam from said light source at predetermined position deflecting means for deflecting the beam from the light source in a predetermined direction; light receiving means for receiving the beam deflected by said deflecting means and modulated by said modulating means; processing means for processing a signal produced by said light receiving means; and adjusting means, responsive to said processing means, for adjusting an imaging position of the beam by said imaging means.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 11A and 11B show signals produced during the adjustment operation in the embodiment of FIG. 10, wherein

DESCRIPTION OF THE PREFERRED EMBODIMENTS

The preferred embodiments of the present invention will be described in conjunction with the drawings. First, the description will be made as to an embodiment which uses a grating having openings arranged in the scanning direction of the beam as a means for modulating the light beam from the light source.

Figure 1:
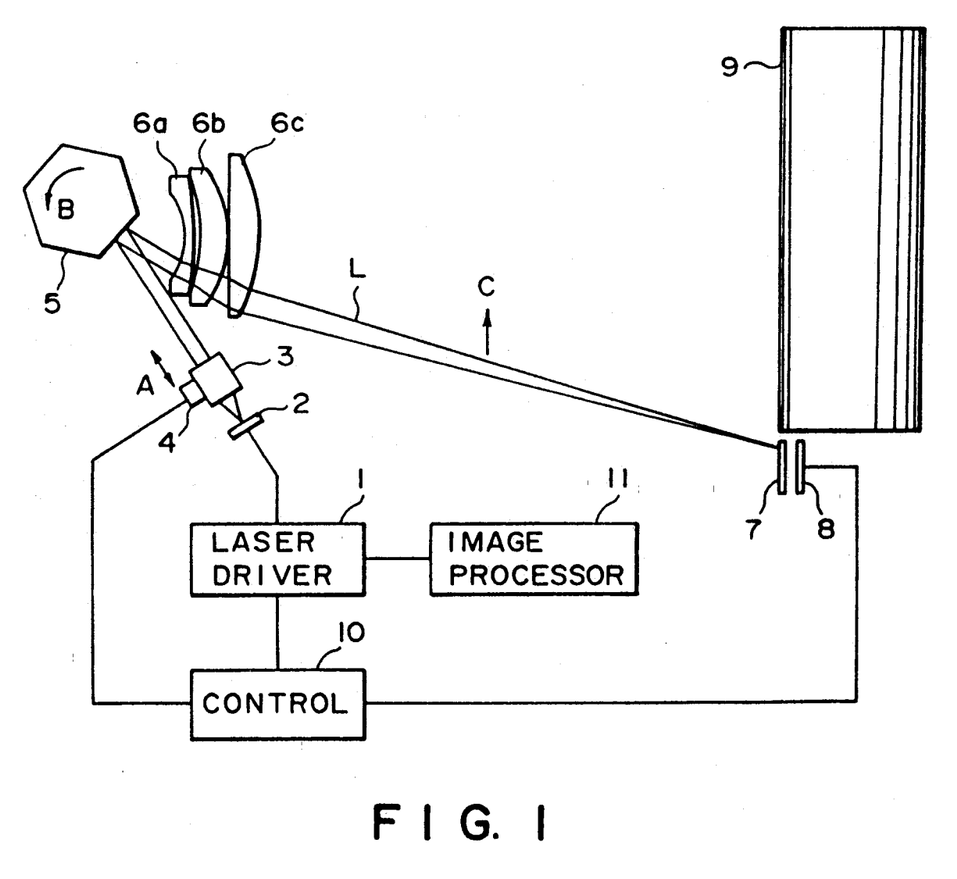
FIG. 1 illustrates a scanning optical apparatus according to a first embodiment of the present invention.

Referring to FIG. 1, there is shown a scanning optical apparatus according to a first embodiment of the present invention, wherein a reference numeral 1 designates a laser driver functioning as a light emitting signal generator for producing a light emitting signal for production of the laser beam. A solid state laser device 2 functioning as a light or laser source is connected to the laser driver 1 and is actuated in accordance with the light emitting signal therefrom. The scanning optical system comprises a collimator lens system for substantially collimating the laser beam emitted from the solid state laser device 2. The collimator lens system 3 is movable through a predetermined distance in a direction A which is parallel to the optical axis of the laser beam, by a focus adjusting means 4 which will be described in detail hereafter. The scanning optical system further comprises a polygonal mirror 5 which is rotatable at a predetermined constant speed in a direction B to deflect the collimated beam from the collimator lens system 3, in a predetermined scanning direction C.

The apparatus further comprises an f-θ lens group constituted by, in this embodiment, lenses 6a, 6b and 6c, disposed upstream of the rotational polygonal mirror with respect to a direction of travel of the laser beam. The f-θ lens group is effective to image the laser beam deflected by the polygonal mirror 5 on the surface to be scanned at a predetermined position and also to provide a constant linear scanning speed on the surface to be scanned. A laser beam L is directed to a light detecting element 8 functioning as a light receiving means for receiving the beam modulated through a bar code filter 7 which is a grating having openings arranged in a predetermined direction and which serves as a modulating means. The laser beam L also scans a surface of a photosensitive drum 9 which is a surface to be scanned.

Around the photosensitive drum 9, an unshown developing device, a primary charger, a transfer charger, an image fixing device and a cleaner or the like are disposed to form a latent image on the surface of the photosensitive drum 9 and to develop a latent image to produce a visualized image, through a known electrophotographic process. The visualized image is then transferred onto a transfer material.

The bar code filter 7 is disposed at a position which is substantially optically equivalent to the surface of the photosensitive drum 9 relative to the light source. More particularly, the distance between the bar code filter 7 and the light source is substantially the same as the distance from the light source to the member to be scanned. In this embodiment, the bar code filter 7 is disposed on a scanning line which is outside the desired scanning width on the scanning line for the surface to be scanned. Here, the desired scanning width on the scanning line means a writing or reading width desired for the writing or the reading on the scanning line.

The light detecting element 8 is connected to a control system 10 for controlling the laser driver 1 and the focus adjusting means 4. An image processing station 11 is connected to the laser driver 1.

In operation for formation of a desired image, an image signal S is transmitted from the image processing station 11 to the laser driver 1 so as to turn on and off the solid state laser device 2 at predetermined intervals. The laser beam emitted from the solid state laser device 2 is substantially collimated by the collimator lens system 3 and then is scanningly deflected in the direction C by the rotational polygonal mirror 5 rotating in the direction B. The deflected beam is imaged as a spot on the photosensitive drum 9 through the f-θ lens group constituted by the lenses 6a, 6b and 6c. The scanning by the laser beam L produces an exposure distribution for one scanning line as an element of an image on the surface of the photosensitive drum 9. The photosensitive drum 9 is rotated through a predetermined amount for each of the scans so that a latent image having an exposure distribution corresponding to the image signal S is formed on the photosensitive drum 9. The latent image is processed and is converted to a visualized image on the recording sheet through unknown electrophotographic process.

The description will be made as to an operation of the focus position adjusting mechanism for the laser beam L. An operation signal is supplied to the laser driver 1 from the control system 10 so that the laser driver 10 produces a wave form signal having a high level for predetermined periods of time, by which the solid state laser device 2 is turned on in response to the signal for the predetermined period with a predetermined constant quantity of light. The laser beam from the solid state laser device 2 is scanningly deflected in the manner described above, so that the bar code filter 7 disposed at a position optically equivalent to the photosensitive drum 9 is illuminated and scanned with the laser beam. The laser beam transmitted through the bar code filter 7 is incident on the light detecting element 8.

Figure 2:
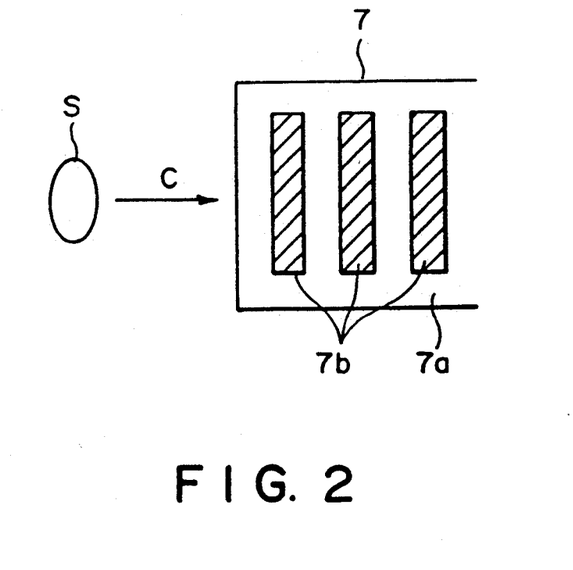
FIG. 2 is an enlarged top plan view of a bar code filter.

FIG. 2 shows the bar code filter 7 seen from the light detecting element 8 side. The scanning laser spot is designated by a reference S, which is moving in the direction C. The bar code filter 7 includes transparent parts 7a (glass or the like) and light blocking parts 7b formed by aluminum evaporation or the like. The width of the transparent parts and the width of the light blocking part as measured in the direction C are substantially the same.

Figure 3A:
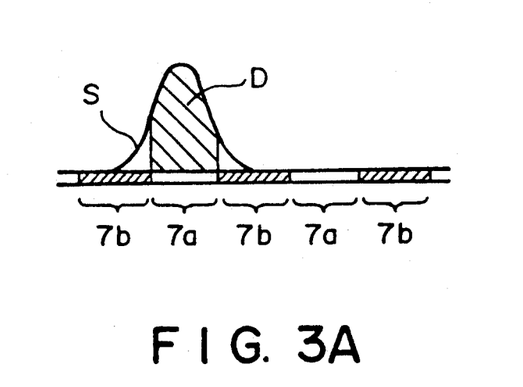
FIGS. 3A and 3B illustrate amount of transmitted light at the position of a scanning spot.
Figure 3B:
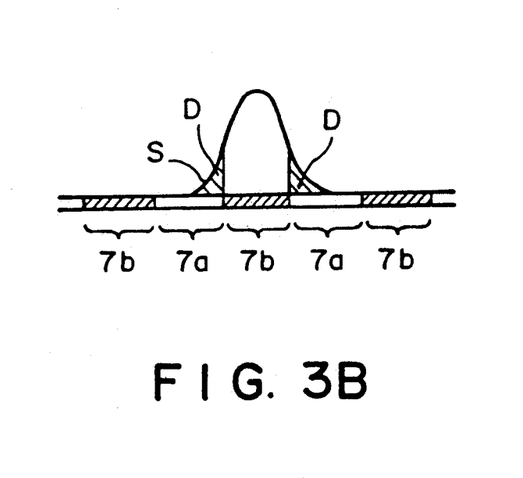
Figure 4A:
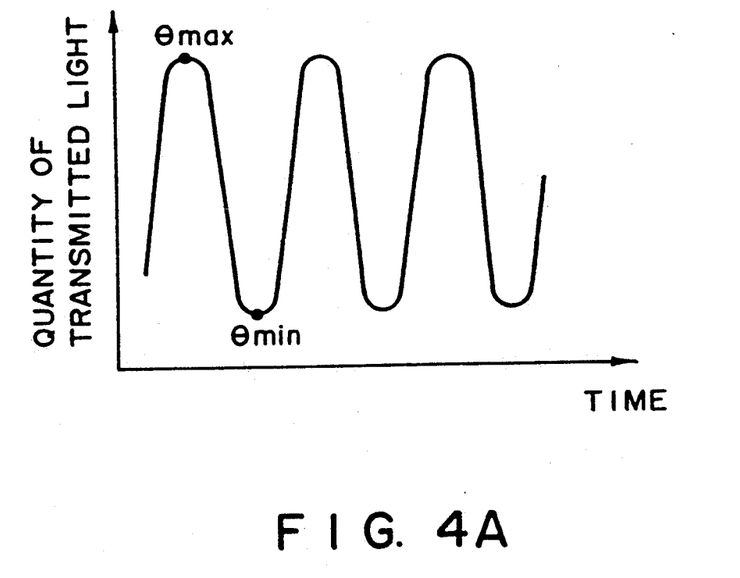
FIGS. 4A and 4B are graphs showing relationships between a scanning spot diameter and the quantity of transmitted light.
Figure 4B:
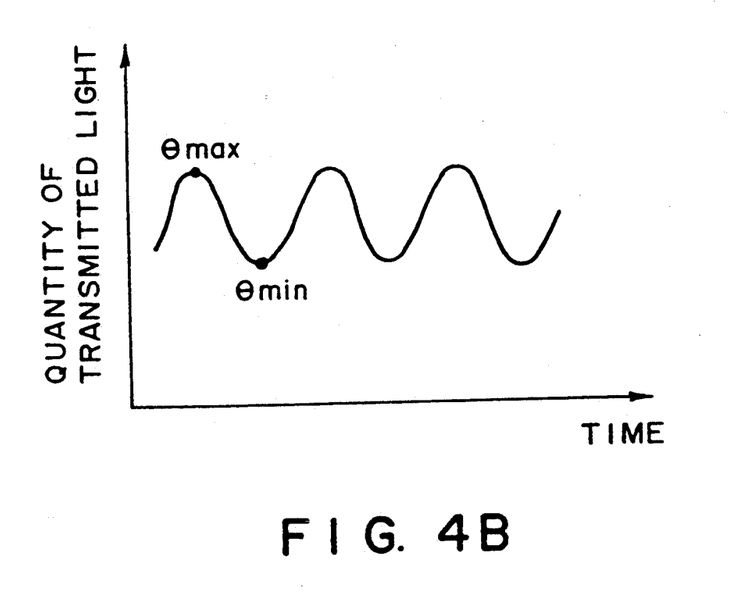

Referring to FIGS. 3A and 3B, there is shown a quantity of light transmitted through the bar code filter 7 which is different depending on the position of the scanning beam spot. FIG. 3A shows the state when the scanning beam spot is at the transparent part 7a, and in this case, the hatched portion D of the scanning spot S is transmitted through the filter, and the remaining portion is blocked. If the imaging state is good, and the size of the scanning spot S measured in the scanning direction is small, the rate of the transmitted light relative to the entire spot light is large, that is, the quantity of the transmitted light is large. If, on the contrary, the imaging state is not good, and therefore, the scanning spot S is large in the scanning direction, the rate of the transmitted light D relative to the entire light of the spot is small, that is, the quantity of the transmitted light is small. Sooner or later, the scanning spot moves to reach the light blocking part 7b. In this state, is the imaging condition is good, and therefore, the size of the scanning spot S in the scanning direction is small, the leakage of the light through the adjacent transparent parts 7a is small. If, on the contrary, the imaging condition is not good, and therefore, the size of the scanning spot S is large in the scanning direction, the leakage of the light through the adjacent transparent parts 7a is large. In this manner, the light quantity distribution on the light detecting element 8 is as shown in FIGS. 4A and 4B, which periodically changes with time in accordance with the size of the spot diameter of the laser source L. The light beam from the light source is alternately repeated in the strength thereof, in other words, is modulated to an amplitude. FIG. 4A shows good imaging condition wherein the scanning spot S size in the scanning direction is small, whereas FIG. 4B shows a bad imaging condition wherein the size of the scanning spot S is large in the scanning direction, that is, the spot is blurred. The light detecting element 4 supplies the signal indicative of the light quantity change to the control system 10. The control system 10 calculates a contrast V by the following equation:

$$V = (\theta_{max} - \theta_{min})/(\theta_{max} + \theta_{min}) \quad (1)$$

where $\theta_{max}$ is a maximum level of the output of the light detecting element 8 (maximum quantity of transmitted light), and $\theta_{min}$ is a minimum thereof (minimum quantity of transmitted light).

The calculated contrast is stored in an unshown memory in the control system 10 as a contrast provided by the current position of the collimator lens system.

Subsequently, the control system 10 moves the collimator lens system 3 through a predetermined distance by a focus adjusting means 4. Then, the contrast V is calculated and stored in the same manner.

The above operation is repeated a predetermined number of times, and the maximum contrast is searched among the stored plural contrasts. Then, the collimator lens system is moved to and fixed at the collimator lens system position having provided the maximum contrast V.

Figure 5:
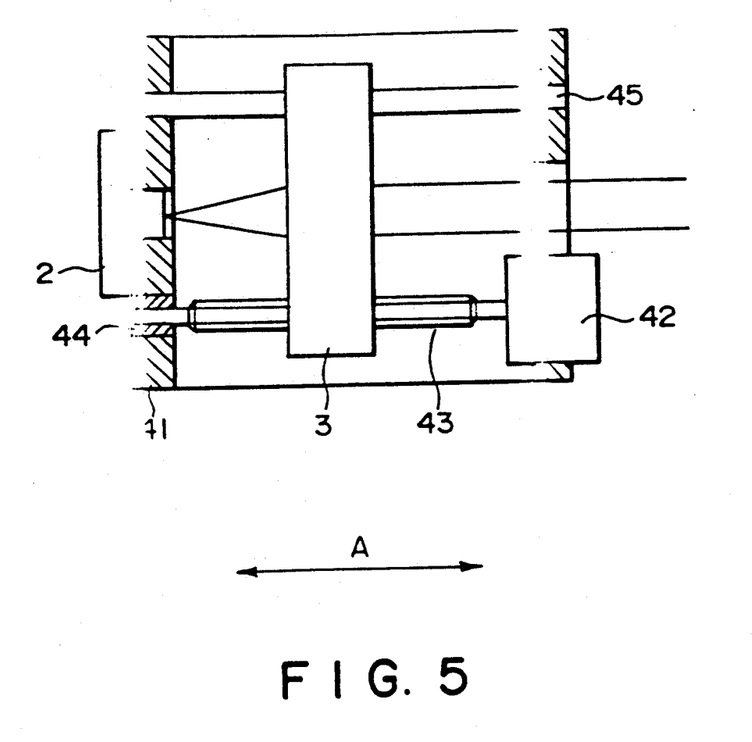
FIG. 5 illustrates in an enlarged scale a mechanism for moving a collimator lens system for focus position adjustment.

Referring to FIG. 5 there is shown in an enlarged scale the collimator lens system 3 equipped with focus adjustment means 4. As shown in this Figure, the collimator lens system 3 includes a frame 41, a solid state laser device 4, a stepping motor 42 and a guiding shaft 45 mounted on the frame 41. The collimator lens system 3 is supported by a lead screw 43 which is formed on an output shaft of the stepping motor 42 and a guiding shaft 45. An end of the lead screw 43 is supported by a bearing 44 fixed to the frame 41. The collimator lens system 3 is provided with a screw for threading engagement with the lead screw 43, and also is provided with a sliding bearing in sliding contact with the guiding shaft 45. The stepping motor 42 is driven in response to a driving signal supplied from the control system 10, by which the lead screw 43 is rotated. By the rotation of the lead screw 43, the collimator lens system 3 is moved in the direction A which is a direction of the optical axis of the laser beam.

As described, according to this embodiment, the laser beam L is imaged on the bar code filter 7 disposed at a position optically equivalent to the photosensitive drum 9 to detect the change of the quantity of the light transmitted through the filter. In response to the detection signal, the position of the collimator lens system 3 is adjusted. Thus, the enlargement of the spot diameter of the laser due to the ambient condition change such as temperature change or the like can be prevented. As a result, the desired size of the spot can be provided at all times, and therefore, the high density and high quality images can always be provided.

As regards the widths, measured in the scanning direction, of the transparent portions and light blocking portions of the bar code filter 7 shown in FIG. 2, it is preferable that it is approximately W/2 when the distribution of the strength of the incident laser beam is Gaussian, where W is a diameter of the laser beam, more particularly, the diameter at which the strength is $1/e^2$ of the strength on the optical axis. With the use of the filter having such widths, the change in the quantity of light can be detected satisfactorily.

Inventor's experiments have revealed that in a apparatus capable of forming a imaged scanning spot having a diameter W of 45 microns in the main scanning direction, the widths of the transparent portions and light blocking portions of the bar code filter are preferably 20–30 microns (0.45 W–0.65 W) in the main scanning direction with good detection of the light quantity change, and particularly, the best result has been obtained when the widths are 25 microns (0.55 W).

On the basis of the equation (1), the widths of the transparent portion and the light blocking portion of the bar code filter are preferably predetermined so that the contrast V (equation (1)) is 0.5–0.6 when the imaging state is the best, and therefore, the dimension of the scanning spot in the scanning direction is minimum. In other words, the determined such that a ratio $R = (\theta_{max}/\theta_{min})$ (where $\theta_{max}$ is the maximum quantity of the transmitted light, and $\theta_{min}$ is minimum quantity of the transmitted light), is 3–4. By selecting the width of the white and black portions of the filter in the manner described above, the change in the contrast is clear in response to the change of the spot diameter.

Figure 6:
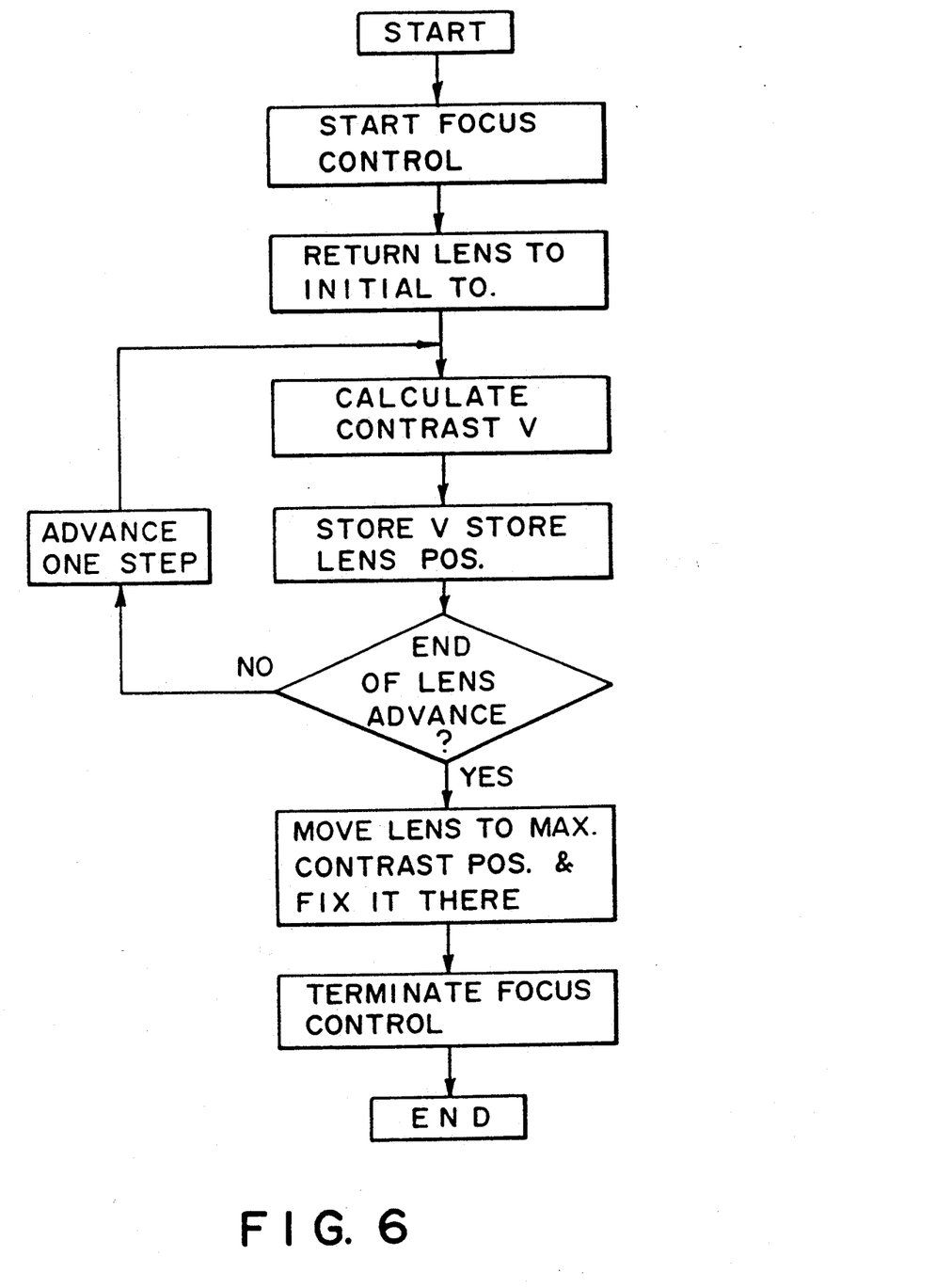
FIG. 6 is a flow chart illustrating operation of the apparatus according to an embodiment of the present invention.

Referring to FIG. 6 which is a flow chart, the operation of the apparatus according to this embodiment will be described in detail. It is assumed that the position where the diameter of the spot of the laser beam is minimum is present in the range wherein the collimator lens system is movable.

A signal for operation of the focus adjustment mechanism is supplied to the control system 10. Then, the focus adjustment system 4 is operated to reset the lens system 3 at its initial position. Subsequently, the laser device 2 is turned on, and the contrast V is determined on the basis of the output of the light detecting element 8.

The value of the determined contrast V and the position of the lens system 3 at that time are stored in a memory of the control system 10.

Upon movement of the lens system 3 by the focus adjusting means, the discrimination is first made as to whether or not the lens system can be performed or not. If so, the lens system is moved through one step, and the contrast V is determined at the new position, and the position and the contrast are memorized. The same operations are repeated until movement of the lens system becomes not possible (end position).

When the end position is reached, the maximum value of the contrasts stored in the control system 10 is searched, and the lens system 3 is moved to the position providing the maximum contrast V and is fixed there. This is the end of the focus adjusting operation.

Figure 7:
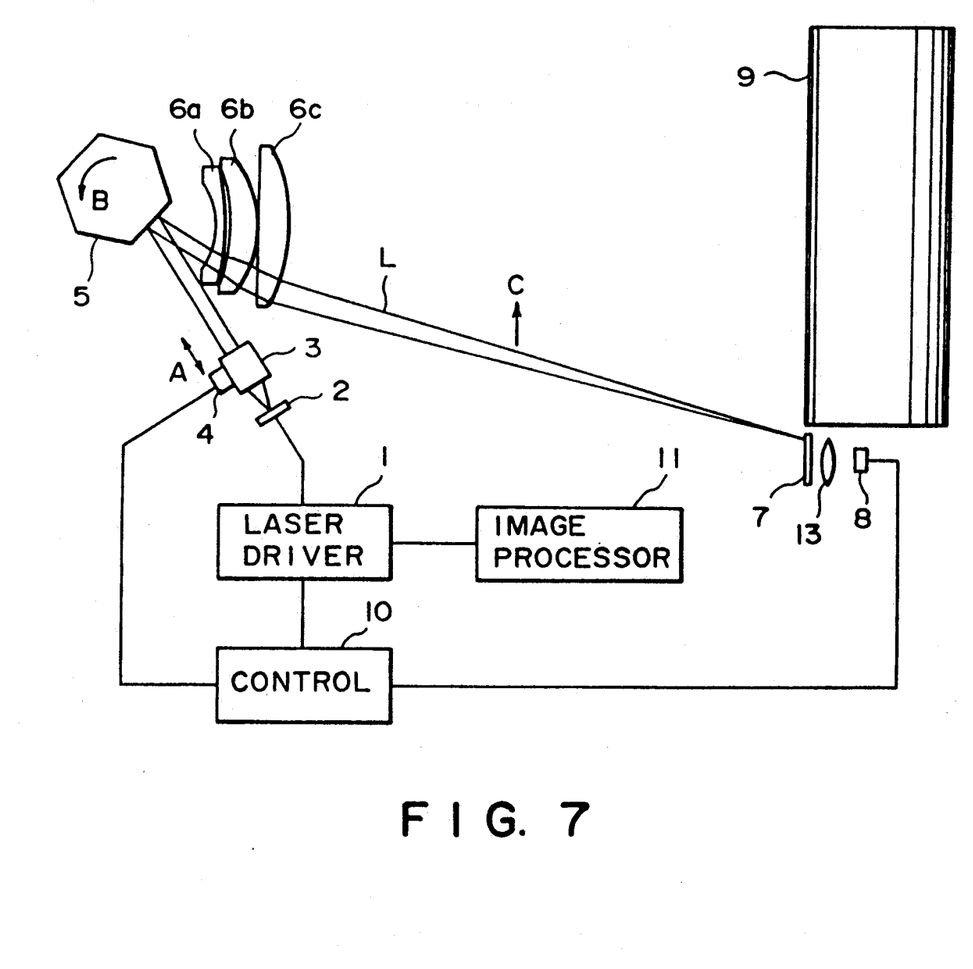
FIG. 7 illustrates a scanning optical apparatus according to another embodiment of the present invention.

Referring to FIG. 7, there is shown another embodiment of the present invention, wherein the same reference numerals as in FIG. 1 are assigned to the elements having the corresponding functions, and detailed description thereof are omitted for simplicity. In this embodiment, the laser beam transmitted through the bar code filter 7 is condensed by a condenser lens 13 and then is incident on the light detecting element 8. With this structure, the better detection of the light quantity change is possible. In addition, the size of the light detecting element 8 can be reduced as compared with the embodiment shown in FIG. 1.

In the embodiments of FIGS. 1 and 7, the light detecting element 8 has only one light receiving portion, but it is possible that the light detecting element 8 has a plurality of light receiving portions arranged in the scanning direction corresponding to the positions of the apertures of the grating, with the same advantageous effects.

In the embodiments of FIGS. 1 and 7, the bar code filter is of a transparent type, but it may be of a reflecting type with the same advantageous effects.

Figure 8:
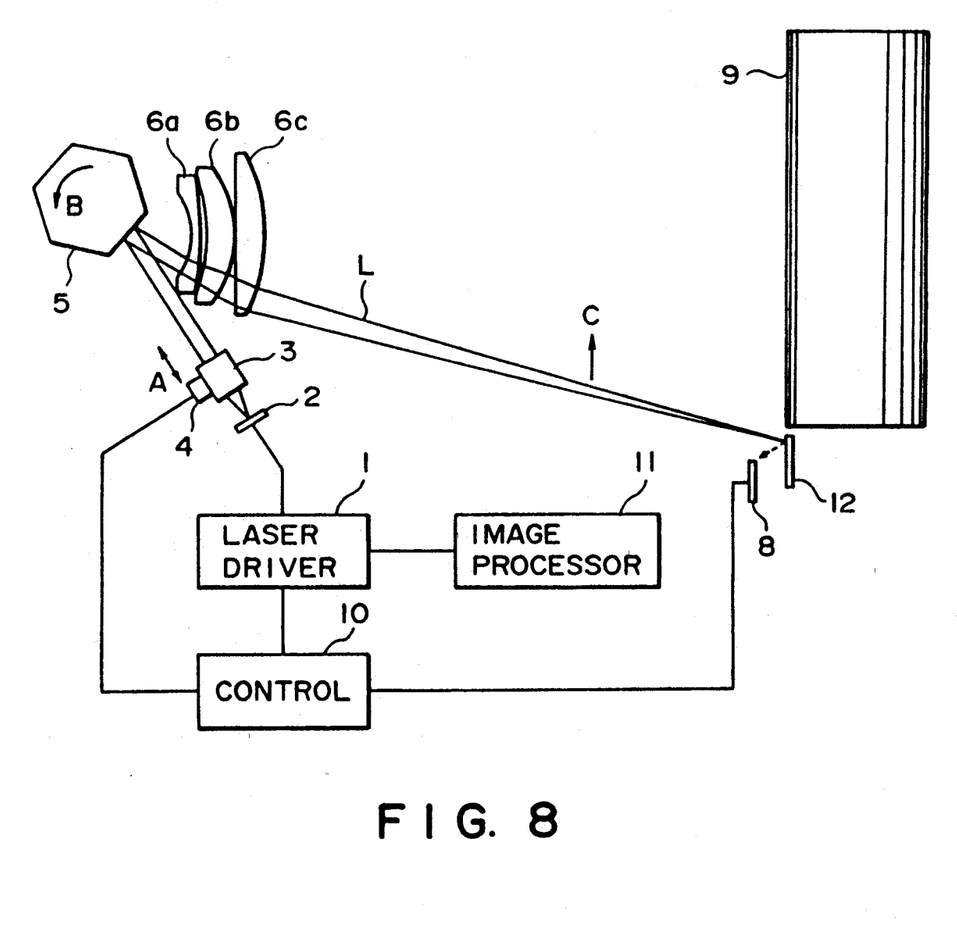
FIG. 8 illustrates a scanning optical apparatus according to a further embodiment of the present invention.

Referring to FIG. 8, there is shown another embodiment wherein a reflecting type bar code filter is used, wherein the same reference numerals as in FIG. 1 are assigned to the elements having the corresponding functions, and therefore, the detailed description thereof is omitted for simplicity. In this embodiment, the laser beam reflected by the bar code filter 12 is incident on the light detecting element 8.

Figure 9:
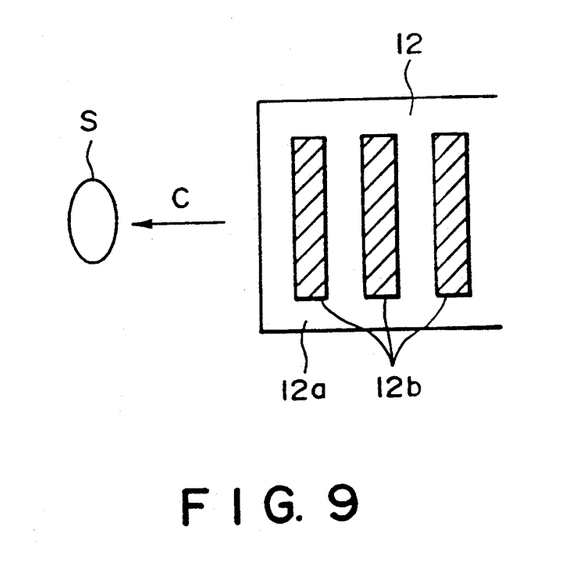
FIG. 9 is a top plan view in an enlarged scale of a reflecting type bar code filter.

Referring to FIG. 9, the reflecting type bar code filter 12 is shown as seen from the light detecting element 8 side. Designated by a reference S is a scanning spot of the laser beam and is moved in the direction C. The reflecting type bar code filter 12 includes a reflecting member 12a made of, for example, aluminum and a mask 12b for absorbing the scanning laser beam to form a bar code extending in the direction perpendicular to the scanning direction.

The light detecting element 8 detects the scanning laser beam reflected by the bar code filter 12 and produces an output corresponding to the quantity of the light received thereby.

When the center of the scanning spot S is on the reflecting member 12a, the quantity of the reflected light is maximum, and therefore, the output of the light detecting element is maximum. When the center of the scanning spot S is on the absorbing material 12b, the strength of the reflected light is minimum, and therefore, the output of the light detecting element 8 is minimum. Accordingly, when the scanning spot S moves on the reflecting type bar code filter with time, the output of the light detecting element changes in the same manner as described with respect to the transparent type bar code filter, and the relationship between the contrast V and the diameter of the scanning spot is the same.

As regards the widths of the reflecting portions 12a and the mask portions 12b of the reflecting type bar code filter, they are preferably determined in the same manner as the transparent portions and the light blocking portions of the transparent type bar code filter.

Another embodiment will be described wherein a light emitting signal generator for transmitting a light emitting signal to the light source is used as a means for modulating the beam from the light source.

Figure 10:
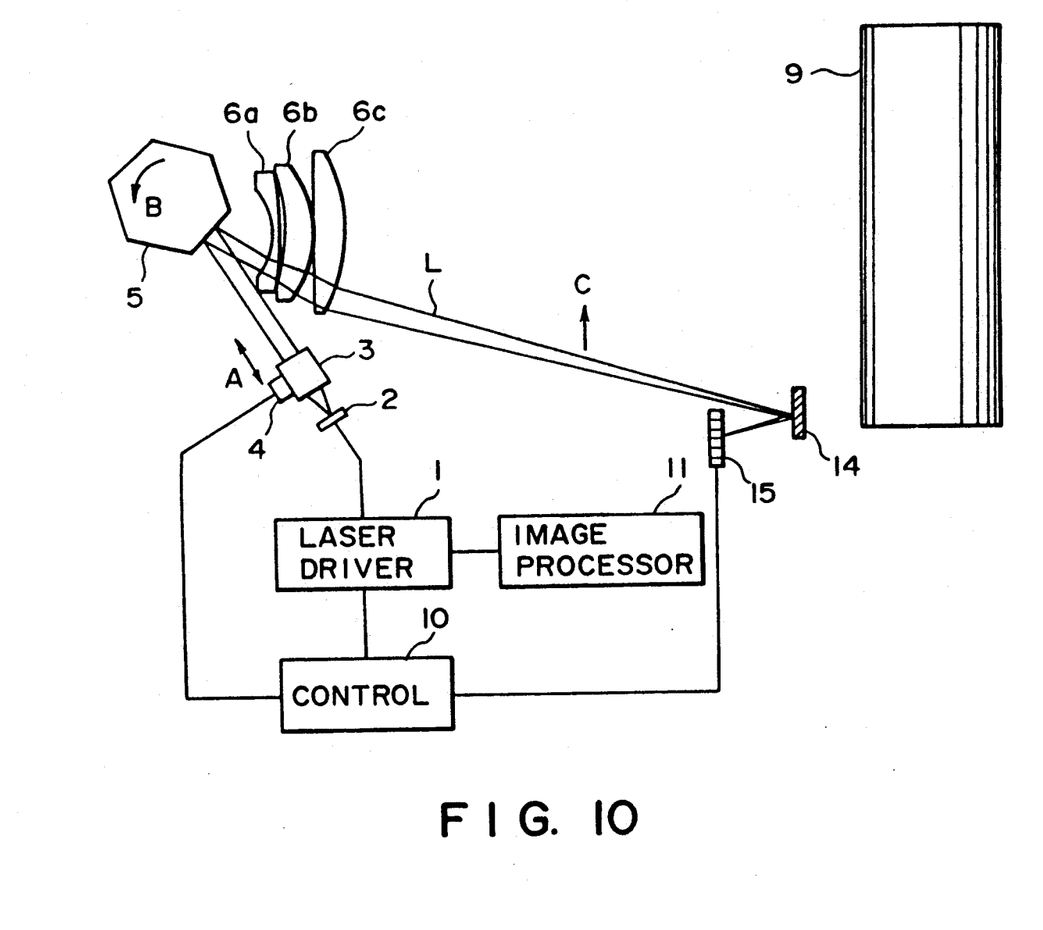
FIG. 10 illustrates a scanning optical apparatus according to a further embodiment of the present invention.

Referring to FIG. 10, this embodiment is shown wherein the same reference numerals as in FIG. 1 are assigned to the elements having the corresponding functions, and therefore, the detailed description thereof is omitted for simplicity. In this embodiment, the laser beam L is directed by way of a reflecting mirror 14 to a CCD (solid state image pickup element) which receives the light. The laser beam L also scans the surface of the photosensitive drum 9 which is a surface to be scanned. The CCD element 15 includes a plurality of light detecting elements arranged in the direction C which is the main scanning direction of the beam, and is disposed at a position substantially optically equivalent to the surface of the photosensitive drum 9 with respect to the light source. In other words, the distance from the CCD element 15 to the light source is substantially the same as the distance from the light source to the surface to be scanned. The CCD element 15 is connected to the light emitting signal generator 1 and the control system 10 for controlling the focus adjustment means 4.

Figure 11A:
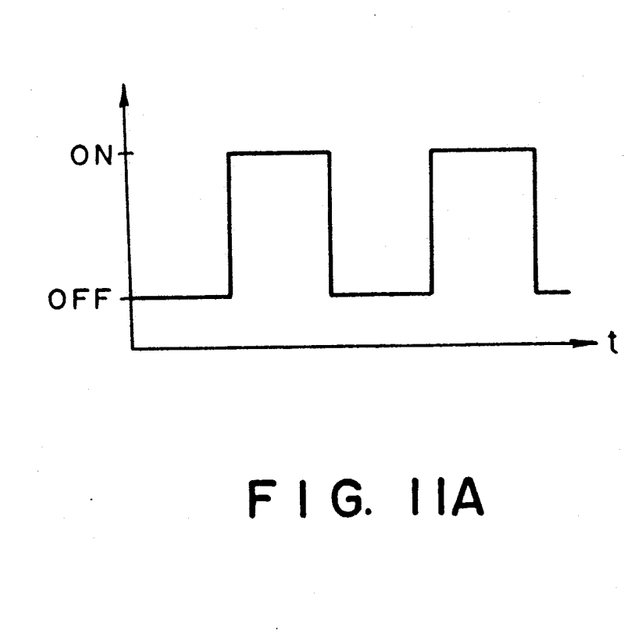
FIG. 11A shows the signal from a laser driver.

The description will be made as to the operation of the focus position adjustment mechanism for the beam L in this embodiment. The control system 10 supplies an operation signal to the laser driver 1, in response to which the laser driver 1 produces for a predetermined period of time a pulse wave which takes high and low levels at regular intervals as shown in FIG. 11A. In response to the pulse wave signal, the solid state laser element device (light source) is actuated. In other words, the light from the light source is intermittently modulated. The laser beam from the solid state laser device 2 is scanningly deflected as described above, and is reflected by the reflecting mirror 14. It is projected and scanningly moved on the CCD element 15 disposed at a position optically equivalent to the photosensitive drum 9.

The control system 10 clears the electric charge accumulated in all of the picture elements of the CCD element 15 before it is scanned with the laser beam L. After electric charge is accumulated in each of the picture elements of the CCD element 15 as a result of the spot scan for one line, the accumulated charge is read out as an electric signal.

Figure 11B:
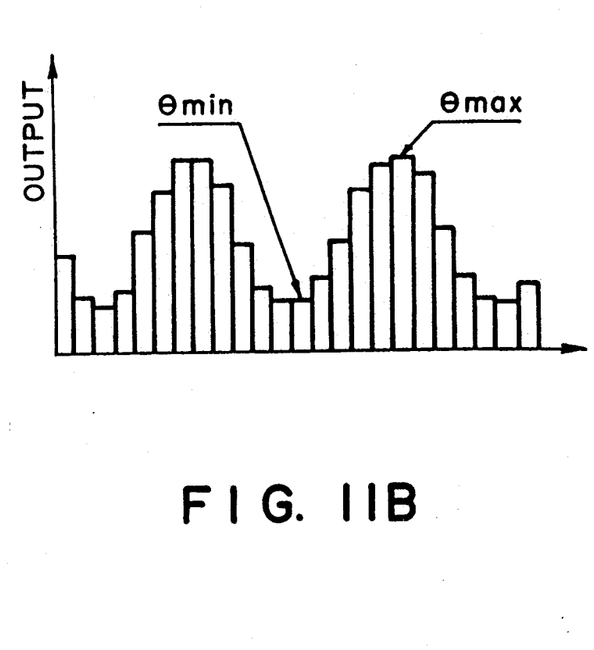
FIG. 11B shows an output signal from a CCD element.
Figure 12:
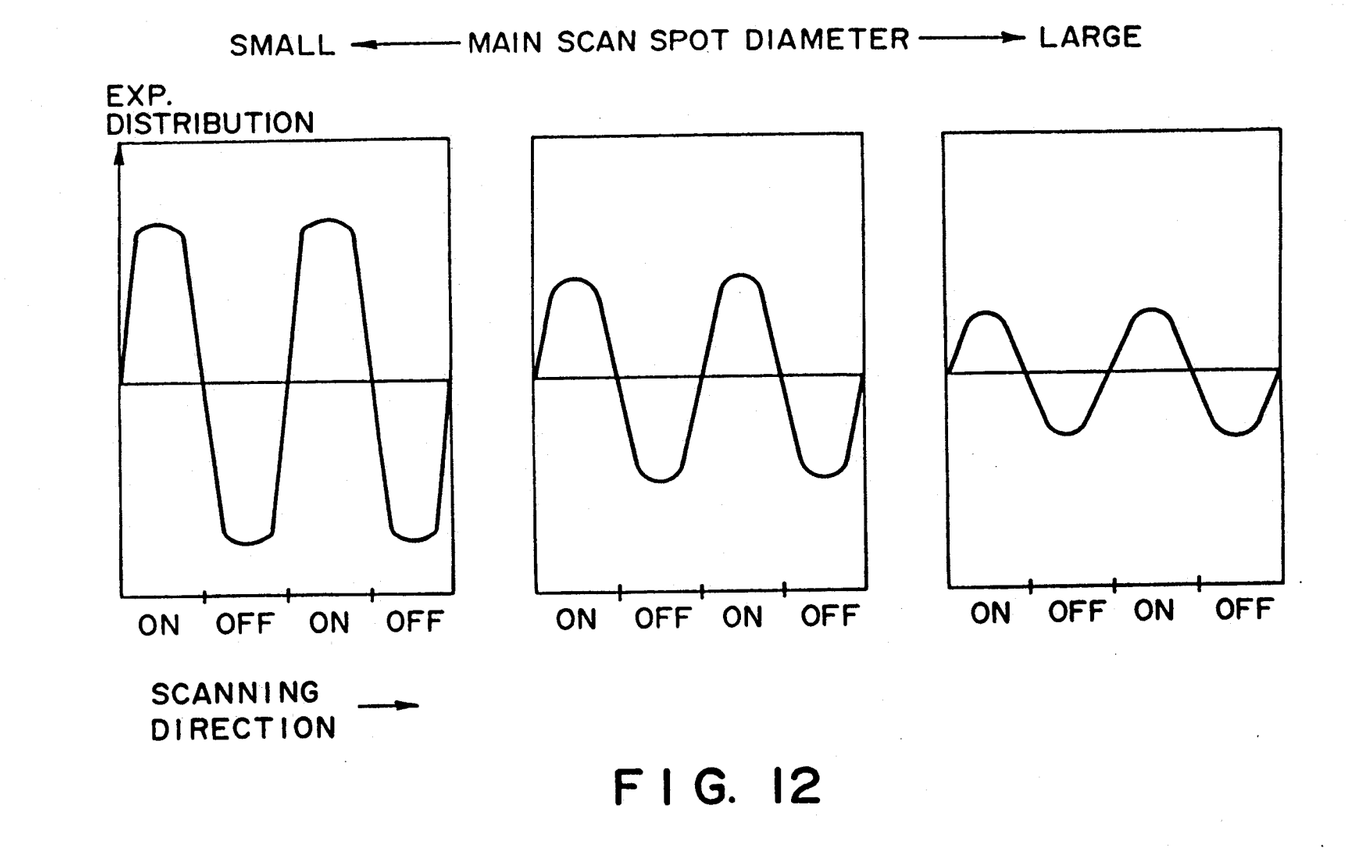
FIG. 12 is a graph showing a relationship between the spot diameter of the laser beam and exposure distribution.

When the CCD element 15 is scanned with the laser beam through one scan while the solid state laser device 2 turns on and off periodically, the distribution of the amount of exposure of the CCD element 15 is as shown in FIG. 12 wherein the strength periodically changes in accordance with the spot diameter of the laser beam L, since the CCD element 15 is disposed at a position optically equivalent to the photosensitive drum 9. Therefore, the output of each of the picture elements of the CCD element 15 is as shown in FIG. 11B. The signal is transmitted to the control system 10, which, in turn, calculates a contrast V by the following equation:

$$V = (\theta_{max} - \theta_{min})/(\theta_{max} + \theta_{min}) \quad (1)$$

where $\theta_{max}$ is the maximum output of the CCD element 15, and $\theta_{min}$ is the The calculated contrast is stored in an unshown memory of the control system 10 as the contrast for the current position of the collimator lens system 3.

Subsequently, the control system 10 moves the collimator lens system 3 through a predetermined amount by the focus adjustment means 4, and the contrast V is calculated, and it is memorized with the position thereof in the similar manner.

Repeating the above operations a predetermined number of times, the maximum contrast of the memorized contrast V is searched, and the collimator lens system is moved to and fixed at the position providing the maximum contrast.

Figure 13:
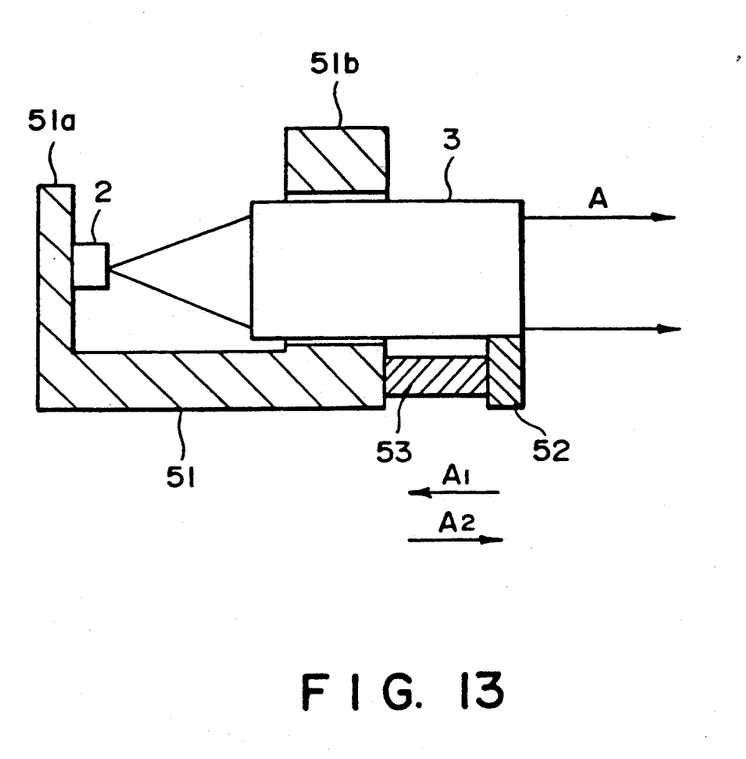
FIG. 13 is an enlarged sectional view of a mechanism for moving a collimator lens system for imaging position adjustment according to a further embodiment.

Referring to FIG. 13, there is shown in an enlarged scale another example of the collimator lens system 3 equipped with the focus adjustment means 4. In this example, the solid state laser device 2 is mounted to a mounting portion 51a of a supporting member 51 having a channel-like cross-section. The collimator lens system 3 is supported in the supporting member 51b for sliding movement in the direction A which is the direction of the optical axis of the laser beam. The bottom of the collimator lens system 3 is formed into a flange 52. The flange 52 and the supporting member are 51 are connected with a piezoelectric actuator 53 including a piezoelectric element or elements which is collapsible and expansible in the direction A, that is, the longitudinal direction, in accordance with a voltage applied thereto. The piezoelectric actuator 53 is electrically coupled with the control system 10 and is driven by the control system 10.

When the collimator lens system 3 is moved by collapse of the piezoelectric actuator 53, that is, in the direction A1, the distance between the collimator lens system 3 and the solid state laser device 2 is reduced, so that the laser beam outgoing from the collimator lens system 3 becomes divergent, and therefore, the position of focus of the scanning optical system is moved away from the f-θ lens group 6c. On the other hand, when the collimator lens system 3 is moved by the expansion of the piezoelectric actuator 53, that is, in the direction A2, the laser beam outgoing from the collimator lens system 3 becomes convergent, so that the focus position is moved toward the f-θ lens group 6c. In place of the piezoelectric actuator 53, a voice coil or the like may be used to move or shift the collimator lens.

As described in the foregoing, by receiving, by light receiving means, the beam which is intermittently modulated in the direction of the beam scan or which is modulated in amplitude, the focus deviation of the beam can be detected without difficulty even if the scanning speed of the beam is high.

In the foregoing embodiments, the collimator lens system is moved in order to move the convergent position of the light beam on the scanning surface, but another known means can be employed as the means for moving the convergent position of the light beam. As examples of these means, there are a movable convex lens disposed between the collimator lens and the rotational polygonal mirror as disclosed in Japanese Laid-Open Patent Application Publication 100113/1085, a movable imaging lens or a movable laser source as disclosed in Japanese Laid-Open Patent Application Publication 116603/1984, a variable optical distance between a scanning lens and a member to be scanned as disclosed in Japanese Laid-Open Patent Application No. 112020/1985 and a variable power laser device as disclosed in Japanese Laid-Open Patent Application No. 275868/1986.

In the foregoing embodiments, the discrimination of the state of imaging has been made using a contrast which is a ratio of light strengths, but if the quantity of light of the laser beam is constant, the discrimination can be made using the maximum of the output of the light detecting element, the minimum of the output of the light detecting element while the scanning laser beam is transmitted through the filter or the difference therebetween.

While the invention has been described with reference to the structures disclosed herein, it is not confined to the details set forth and this application is intended to cover such modifications or changes as may come within the purposes of the improvements or the scope of the following claims.

What is claimed is:

1. A scanning optical apparatus, comprising:
a light source;
deflecting means for deflecting a light beam from said light source to scan a predetermined surface with the beam;
optical means, disposed in an optical path between said light source and said deflecting means, for directing the light beam from said light source to said deflecting means;
modulating means for modulating the light beam deflected by said deflecting means, said modulating means being provided with a plurality of apertures arranged in a direction of the scan by the light beam;
detecting means for receiving the light beam modulated by said modulating means; and
wherein a part of a lens system constituting said optical means is moved in a direction of an optical axis for said optical system in accordance with an output of said detecting means to adjust an imaging position of the light beam scanning the predetermined surface.

2. A laser beam printer, comprising:
a light source;
deflecting means for deflecting a light beam from said light source;
optical means, disposed in an optical path between said light source and said deflecting means, for directing the light beam from said light source to said deflecting means;
a recording material for receiving the light beam deflected by said deflecting means;
modulating means for modulating the light beam deflected by said deflecting means, said modulating means being provided with a plurality of apertures arranged in a direction of the scan of the light beam;
detecting means for receiving the light beam modulated by said modulating means; and
wherein a part of a lens system constituting said optical means is moved in a direction of an optical axis of said optical means in accordance with an output of said detecting means to adjust an imaging position of the light beam on the recording material.

3. A scanning optical apparatus, comprising:
a light source;
deflecting means for deflecting the light beam from said light source to scan a predetermined surface with the light beam;
optical means, disposed in an optical path between said light source and said deflecting means, for directing the light beam from said light source to said deflecting means;
detecting means for receiving the light beam deflected by said deflecting means, said detecting means being provided with a plurality of detecting portions arranged in a direction of the scan of the light beam; and wherein a part of a lens system constituting said optical means is moved in a direction of an optical axis of said optical means in accordance with an output signal of said detecting means to adjust an imaging position of the light beam scanning the predetermined surface.

4. A laser beam printer, comprising:

a light source;

deflecting means for deflecting a light beam from said light source;

optical means disposed in an optical path between said light source and said deflecting means, for directing the light beam from said light source to said deflecting means;

a recording material for receiving the light beam deflected by said deflecting means;

detecting means for receiving the light beam deflected by said deflecting means, said detecting means being provided with a plurality of detecting positions arranged in a direction of the scan of the light beam; and wherein a part of a lens system constituting said optical means is moved in a direction of an optical axis of said optical means in accordance with an output signal of said detecting means to adjust an imaging position of the light beam on the recording material.

5. A scanning optical apparatus, comprising:

a light source;

deflecting means for deflecting a light beam from said light source to scan a predetermined surface with the beam;

optical means, disposed in an optical path between said light source and said deflecting means, for directing the light beam from said light source to said deflecting means;

modulating means for modulating the light beam deflected by said deflecting means, said modulating means being provided with a plurality of apertures arranged in a direction of the scan by the light beam;

detecting means for receiving the light beam modulated by said modulating means;

light converging means disposed between said modulating means and said detecting means; and wherein a part of a lens system constituting said optical means is moved in a direction of an optical axis of said optical system in accordance with an output of said detecting means to adjust an imaging position of the light beam scanning the predetermined surface.

6. A laser beam printer, comprising:

a light source;

deflecting means for deflecting a light beam from said light source;

optical means, disposed in an optical path between said light source and said deflecting means, for directing the light beam from said light source to said deflecting means;

a recording material for receiving the light beam deflected by said deflecting means;

modulating means for modulating the light beam deflected by said deflecting means, said modulating means being provided with a plurality of apertures arranged in a direction of the scan of the light beam;

detecting means for receiving the light beam modulated by said modulating means;

light condensing means disposed between said modulating means and said detecting means; and wherein a part of a lens system constituting said optical means is moved in a direction of an optical axis of said optical means in accordance with an output of said detecting means to adjust an imaging position of the light beam on the recording material.

7. A method of adjusting a focal point of a scanning optical system, comprising the steps of:

deflecting a light beam from a light source through deflecting means and modulating means, while changing a position of a lens system for imaging the light beam from the light source in a direction of an optical axis thereof;

receiving the deflected light beam by receiving means;

storing an output of said light receiving means and a position of the lens system in the direction of the optical axis when the output is produced; and searching a maximum in the memory provided by said storing step, and moving the lens system to and fixing it at a position corresponding to the maximum.

8. A method of adjusting a focal point of a scanning optical system, comprising the steps of:

deflecting a light beam from a light source through deflecting means and modulating means, while changing a position of a lens system for imaging the light beam from the light source in a direction of an optical axis thereof;

receiving the deflected light beam by light receiving means;

storing an output of said light receiving means and a position of the lens system in the direction of the optical axis when the output is produced; and searching a maximum in the memory provided by said storing step, and moving the lens system to and fixing it at a position corresponding to the maximum of the stored output.

* * * * *